J. S. DUNLAP.
GEAR WHEEL.
APPLICATION FILED MAR. 30, 1916.
1,199,455.
Patented Sept. 26, 1916.
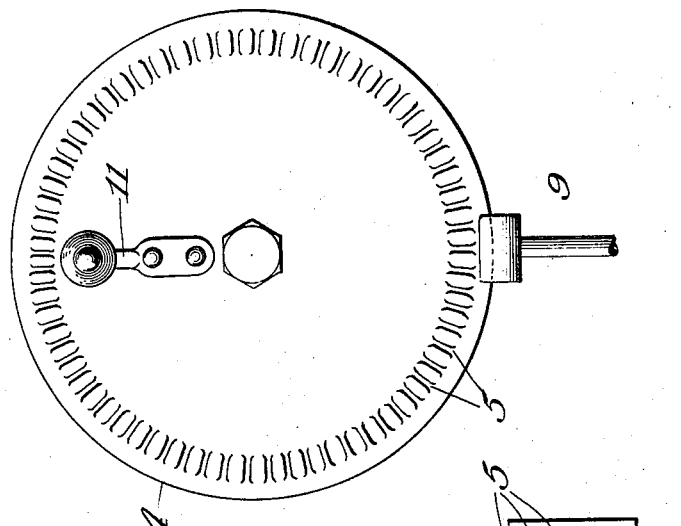
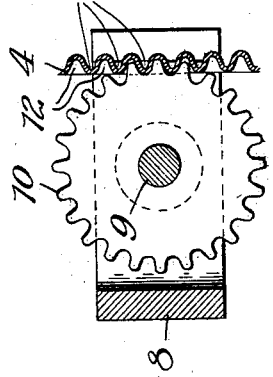
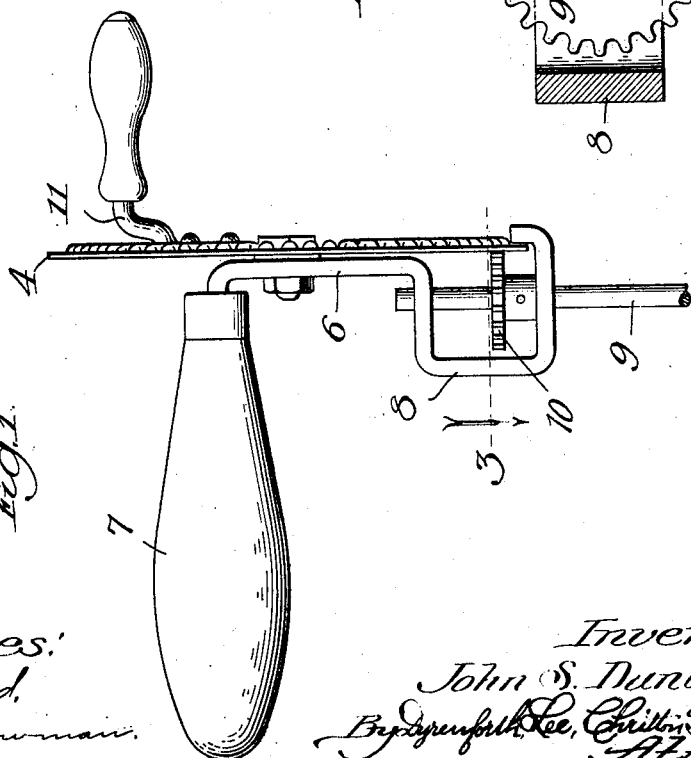

UNITED STATES PATENT OFFICE.

JOHN S. DUNLAP, OF CHICAGO, ILLINOIS.

GEAR-WHEEL.

1,199,455.  Specification of Letters Patent.  Patented Sept. 26, 1916.

Application filed March 30, 1916. Serial No. 87,688.

*To all whom it may concern:*

Be it known that I, JOHN S. DUNLAP, a citizen of the United States, residing at Chicago, in the county of Cook and State of Illinois, have invented a new and useful Improvement in Gear-Wheels, of which the following is a specification.

The object of my invention is to enable a superior gear-wheel to be so made of very thin and cheap sheet-metal that it will be reinforced by the manner of providing it with gear-teeth, and be thus rendered as strong as one made of much heavier and more expensive sheet-metal; and the teeth will incidentally be hardened and, besides, afford pockets tending to retain the lubricant employed in driving it.

Wheels of the type to which my improvement relates are used, mainly, in gearing for relatively light work, such as is performed by beaters employed for culinary manipulations, like the beater of my Patent No. 820,405, dated May 15, 1906, for which particular use I have more especially devised the present gear. A commercial requirement of such light gears is cheapness of construction, but not at the expense of strength and durability; and a gear of my improved construction possesses the desirable quality of cheapness, and is as strong and durable as other gears of the same class made of relatively heavy and expensive sheet-metal.

In the accompanying drawing, Figure 1 is a broken view showing my improved gear in edge elevation operatively applied; Fig. 2 shows the same by a view in rear elevation; and Fig. 3 is an enlarged section on line 3, Fig. 1.

The gear 4 of my improved construction is a wheel of the preferred disk form illustrated, of very thin sheet-metal, having its teeth 5 formed of corrugations produced in circumferential series on both of its faces by die-pressing them out of the metal of the disk. By thus producing the gear-teeth, the radial corrugations about the opposite faces of the wheel, near its periphery, reinforce the thin sheet-metal, and render it as strong and rigid as the same metal of much heavier gage, and adapt it to effectually resist flexing under the strains to which it is subjected in use.

To illustrate one application of my improved gear-wheel, it is shown to be journaled at its center upon the stem 6 of a handle 7, the flat-metal stem being bent to form a rectangular bracket 8, in which is journaled a shaft 9 carrying within the bracket a pinion 10 meshing with the gear-teeth 5 in the face of the disk inside its circumferential edge-portion, rotation of which disk, through the medium of a crank 11 on its opposite face, drives the pinion to rotate the shaft, which may carry a dasher or other desired device (not shown) on its lower or inner end. The depressions between the teeth 5, formed in producing the reinforcing radial corrugations affording the gear-teeth by the die-pressure, provide pockets 12 tending to retain the lubricant used for the coöperating gear and pinion, and thus to hold the supply and enhance its effectiveness; and drawing of the metal by the die-pressure employed for producing the reinforcing tooth-forming corrugations tends to harden it there and thus increase the wearing quality of the teeth, and, consequently, the durability of the gear.

The upturned extremity of the bracket 8 extends transversely across the plane marginal portion of the disk about the corrugations therein to tend to prevent springing of the gear-teeth away from the pinion in the rotation of the wheel.

What I claim as new and desire to secure by Letters Patent is:

A gear-wheel of thin sheet-metal, having stamped radially-extending reinforcing corrugations about its opposite faces, forming the gear-teeth, and a plane marginal portion about said corrugations.

JOHN S. DUNLAP.